US007957930B2

(12) United States Patent
Wu

(10) Patent No.: US 7,957,930 B2
(45) Date of Patent: Jun. 7, 2011

(54) ANGLE SENSING DEVICE AND ANGLE SENSING SYSTEM

(75) Inventor: Ruh-Hua Wu, Longtan Shiang (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 0 days.

(21) Appl. No.: 12/334,458

(22) Filed: Dec. 13, 2008

(65) Prior Publication Data

US 2010/0147617 A1    Jun. 17, 2010

(51) Int. Cl.
*G01C 1/00* (2006.01)
*G01C 19/18* (2006.01)
(52) U.S. Cl. .......................................... 702/151; 701/44
(58) Field of Classification Search .................... 702/41, 702/141, 142, 145, 148, 151; 701/37, 41, 701/44, 57; 477/123, 166; 180/443, 444, 180/446
See application file for complete search history.

(56) References Cited

U.S. PATENT DOCUMENTS

| 6,738,725 | B2 * | 5/2004 | Koga et al. ................... | 702/151 |
| 6,901,320 | B2 * | 5/2005 | Yao et al. ....................... | 701/44 |
| 7,301,446 | B2 * | 11/2007 | Ray et al. ..................... | 340/444 |
| 2005/0064993 | A1 * | 3/2005 | Ginther et al. ................ | 477/166 |

* cited by examiner

*Primary Examiner* — John H Le

(57) ABSTRACT

An angle sensing system for sensing a rotating angle of a steering wheel includes a sensing unit, a processing unit, and a storage unit. The sensing unit detects the rotating angle of a steering column connected to the steering wheel and outputting a sensing signal based on the rotating angle. When the steering column rotates for a circle, the sensing signal presents a non-continuous status. The processing unit calculates the relative angle in a single loop of the steering column based on the sensing signal and the number of loops according to the number of the non-continuous status. The storage unit stores the information of the relative angle and the number of loops. Based on the number of loops and the relative angle, the rotating angle of the steering wheel is detected.

20 Claims, 5 Drawing Sheets

ANGLE SENSING DEVICE AND ANGLE SENSING SYSTEM

BACKGROUND OF THE INVENTION

1. Field of the Invention

The present invention relates to an angle sensing device for a steering wheel; particularly, an angle sensing device integrated with a steering column.

2. Description of the Prior Art

The Steering Angle Sensor (SAS) can be used to measure the angle and the angular velocity for a driver to rotate the steering wheel and it is an important module of the advanced vehicle control system. The angle sensor can not only obtain the information of a driver to control a car, but also provide the information to the Electrical Control Unit (EUC) for being an input message to control the car's movement. Moreover, the information can be the reference information of the accommodation headlight steering system.

In general, the maximum scope of the angle sensor is 360°. However, the steering rotating angle is usually more than 360° (generally the steering wheel design has the positive and negative two-and-half rotation angle, i.e. 1800°). Therefore, it is necessary to have a special design to match the sensing scope of 1800°. On the other hand, even after the power supply stops, it is still possible for the steering wheel to rotate and is then different from the original rotating angle. Hence, it is crucial that the design of the steering angle sensor reflects the actual angle of the steering wheel after the power supply is refreshed.

In prior art, the question mentioned above can be solved by three sets of gears and two sensors. The steering column of the steering wheel can be set in the center of the primary gear, and the primary gear can rotate along with the steering column. The primary gear can lead the two secondary gears to rotate; the teeth of the two secondary gears differ by a tooth, and at the same time, the two sensors sense the rotating angle of the two secondary gears respectively. In the prior art, the rotating angle of the steering column (the primary gear) has a one-by-one relationship with the rotating angle bias of the two secondary gears. By calculating the bias in angle, the rotating angle of the steering column can be figured out in a certain range of angles. The above-mentioned art can sense the rotating angle of the steering wheel in a certain range of angles, and is not limited to the influence of stopping the power supply and cause the inability to respond to the actual angle of the steering wheel.

However, the method used in the prior art requires at least three sets of gears and two sensors and it is not desirable in terms of production cost. On the other hand, the sensing method is only suitable for a specific range of angles; if the angle exceeds this specific range, the output of the angle scope will generate an error the user is not aware of. Although the range of sensing angles can be changed by redesigning the number of teeth in each gear, the redesigning process will also create the difficulty of expansion and increase the production cost.

SUMMARY OF THE INVENTION

Accordingly, an aspect of the present invention is to provide a steering angle sensing device sensing the rotating angle of the steering wheel via a sensor to solve the above problem.

According to an embodiment of the present invention, the angle-sensing device includes a sensing unit, a processing unit and a storage unit. The sensing unit can be used for sensing the rotating angle of the steering wheel from a datum point and, depending on the rotating angle, output a sensing signal. The processing unit, based on the sensing signal, determines the number of loops of the steering wheel rotating from the datum point and the relative angle in a single loop relating to the datum point. The storage unit is used for receiving and storing the number of loops and the relative angle in a single loop.

In the embodiment, when the steering wheel rotates a circle (i.e. the steering wheel rotates cross the datum point), the sensing signal of the sensing unit presents a non-continuous status, and the processing unit, based on the presenting times of the non-continuous status, determines the steering wheel rotating the number of loops. Based on the number of loops and the relative angle in a single loop, the processing unit calculates the rotating angle of the steering wheel. Besides, the function of the storage unit storing the number of loops and the relative angle in a single loop can record the rotating angle of the steering wheel when the angle sensing device stops operation (for example, the external power source stops supplying electric power.).

Accordingly, another aspect of the present invention is to provide a steering angle sensing system sensing the rotating angle of the steering wheel via a sensor and cooperating a design of a steering column to sense the correct rotating angle of the steering wheel after the angle-sensing system refreshes normal operation.

According to an embodiment of the present invention, the angle sensing system of the invention includes a steering column, a sensing unit, a processing unit, a storage unit and a bolt. Wherein the steering column connects with the central axis of the steering wheel and rotates together with the steering wheel. The sensing unit is for sensing the rotating angle of the steering column from the datum point and, according to the rotating angle, outputs a sensing signal. The processing unit, based on the sensing signal, determines the number of loops of the steering column rotating from the datum point and the relative angle in a single loop relating to the datum point. The storage unit is for receiving and storing the number of loops and the relative angle in a single loop.

In the embodiment, the steering column includes a first keyway and a second keyway roughly disposed in parallel. When the angle sensing system stops operation and the steering column, along with the steering wheel, rotates to one of the first keyway and the second keyway aiming at the bolt, the bolt can be embedded in the first keyway or the second keyway to fix the steering column and the steering wheel. By limiting the rotating angle of the steering column when the angle sensing system stops operation, after the angle sensing system refreshes operating, it can calculate and get the real rotating angle of the steering wheel according to the deflection angle of the steering column in the period of stop operation.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

Figure 1:
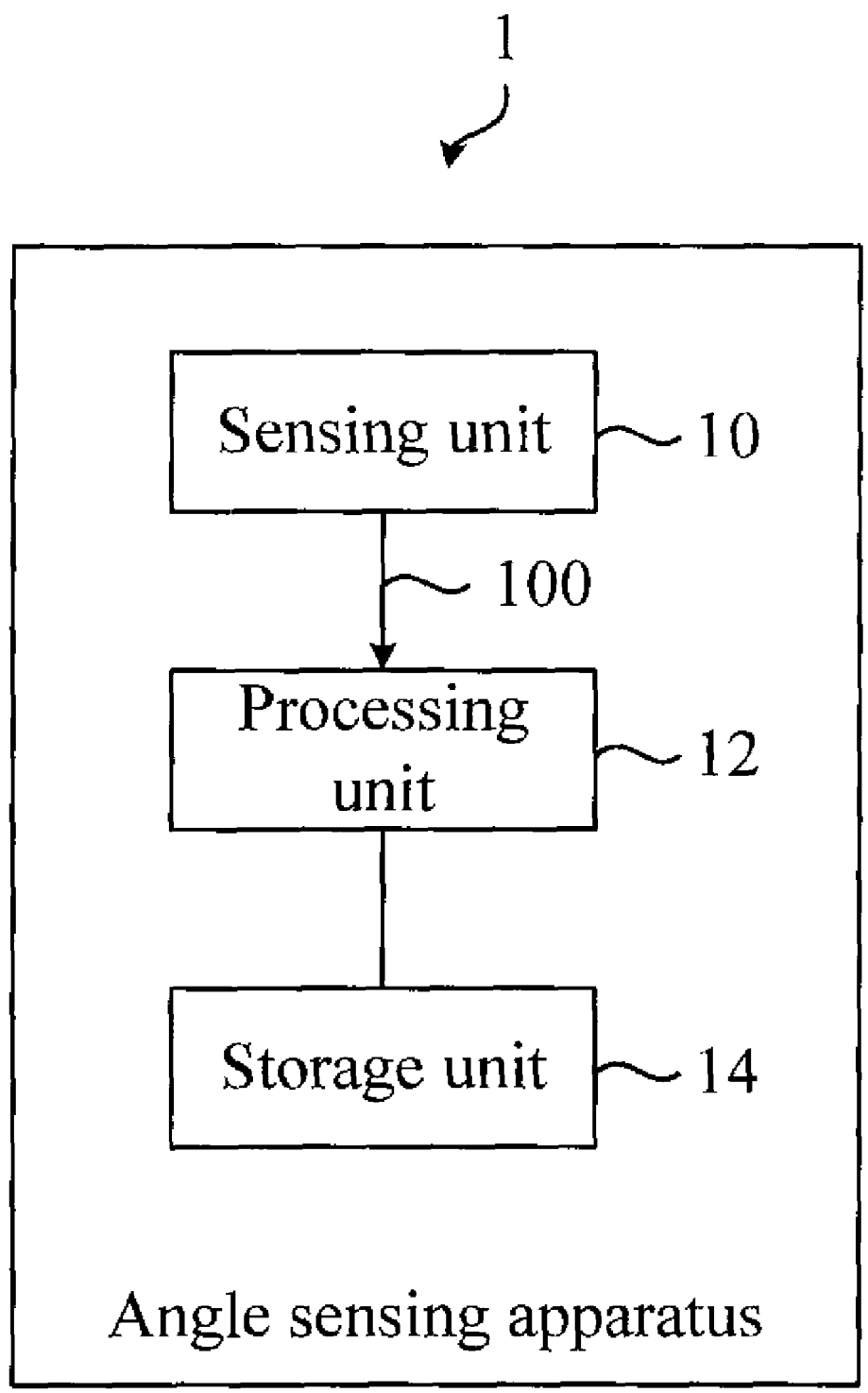
FIG. 1 is an angle sensing device according to an embodiment of the invention.

Please refer to FIG. 1, which illustrates an angle sensing device 1 according to an embodiment of the invention. As shown in FIG. 1, the angle sensing device 1 includes a sensing unit 10, a processing unit 12 and a storage unit 14. In practice, the angle sensing device 1 in the embodiment can be used for sensing the rotating angle of the steering wheel and the steering column connecting the same (not illustrated in the figure) in the transportation.

In the embodiment, the sensing unit 10 can sense the steering wheel or directly sense the rotating angle of the steering wheel and, based on the sensing angle, output a sensing signal 100. Please note that the sensing unit 10 in practice is a non-contact Hall effect angle sensor, a circular optical encoder or a resolver with the maximum sensing angle of 360°. However, depending on different kinds of transportation, the steering wheel usually is set to be able to rotate multi-loops, i.e. its rotating angle is bigger than 360°. For example, a car's steering wheel can generally rotate 2.5 loops clockwise or counterclockwise; in other words, the scope of the rotating angle achieves 1800°.

In the embodiment, when the steering wheel and the steering column rotate a circle in clockwise or counterclockwise from a datum point and back to the datum point, the sensing signal 100 outputted by the sensing unit 10 presents a non-continuous status; the appearance times of the non-continuous status means the rotating loops of the steering wheel (in accordance with the identical rotating direction). For example, please refer to FIG. 2 and FIG. 3 which illustrate the sensing signal 100 of FIG. 1 which presents a non-continuous status.

Figure 2:
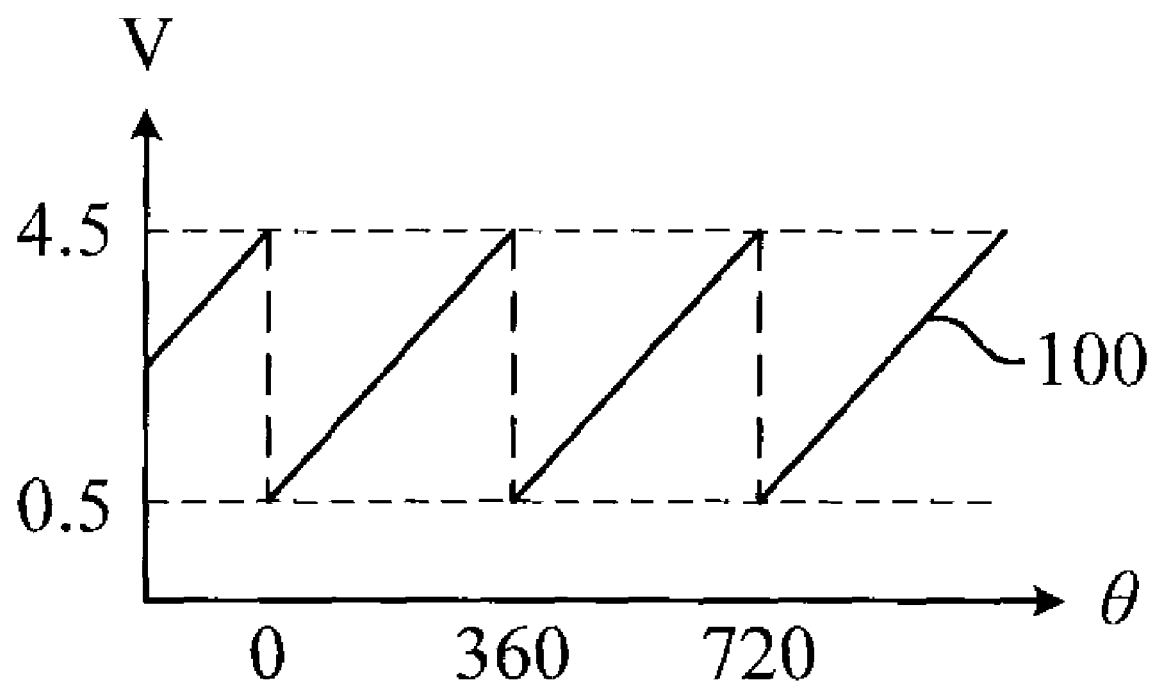
FIG. 2 and FIG. 3 are the sensing signal of FIG. 1 presenting a non-continuous status.

As shown in FIG. 2, the sensing unit 10, based on the sensing rotating angle of the steering wheel or the column, outputs an analogical sensing signal 100, wherein the horizontal axis is the rotating angle θ of the steering wheel and the vertical axis is the output voltage V outputted by the sensing signal 100 corresponding to the rotating angle of the steering wheel. Please note that when the steering wheel rotates cross the angles such as at 360°, 720°, etc. (i.e. the steering wheel rotates a loop or multi-loops from the datum point and returns to the datum point), the output voltage of the sensing signal 100 will drop to the bottom from the peak and presents a non-continuous status. According to the appearance times of the non-continuous status for the sensing signal 100, the processing unit 12 can determine the rotating loops of the steering wheel. In addition, the voltage strength of the sensing signal 100 represents the relative angle in a single loop of the steering wheel relating to the datum point. And the processing unit 12, based on the relative angle in a single loop in coordination with the rotating loops of the steering wheel, calculates to obtain the actual rotating angle of the steering wheel and the steering column.

Please note that the said appearance times of the non-continuous status determining the rotating loops is in a condition of the steering wheel rotating continuously towards an identical direction (for example, clockwise). In practice, if the steering wheel can rotate toward another direction (for example, counterclockwise), the rotating direction of the steering wheel can be defined as positive or negative symbol to judge the correct rotating angle. For example, if a user rotates a steering wheel 900° in clockwise and 200° in counterclockwise, presenting the non-continuous status when clockwise rotation as positive loops, and the non-continuous status when counterclockwise rotation as negative loops are simultaneously set, the processing unit 10 judges the number of loops as +1 loop according to the presenting non-continuous status when doing clockwise and counterclockwise rotation (-non-continuous status has been presented two times with clockwise rotation, and once with counterclockwise rotation).

Figure 3:
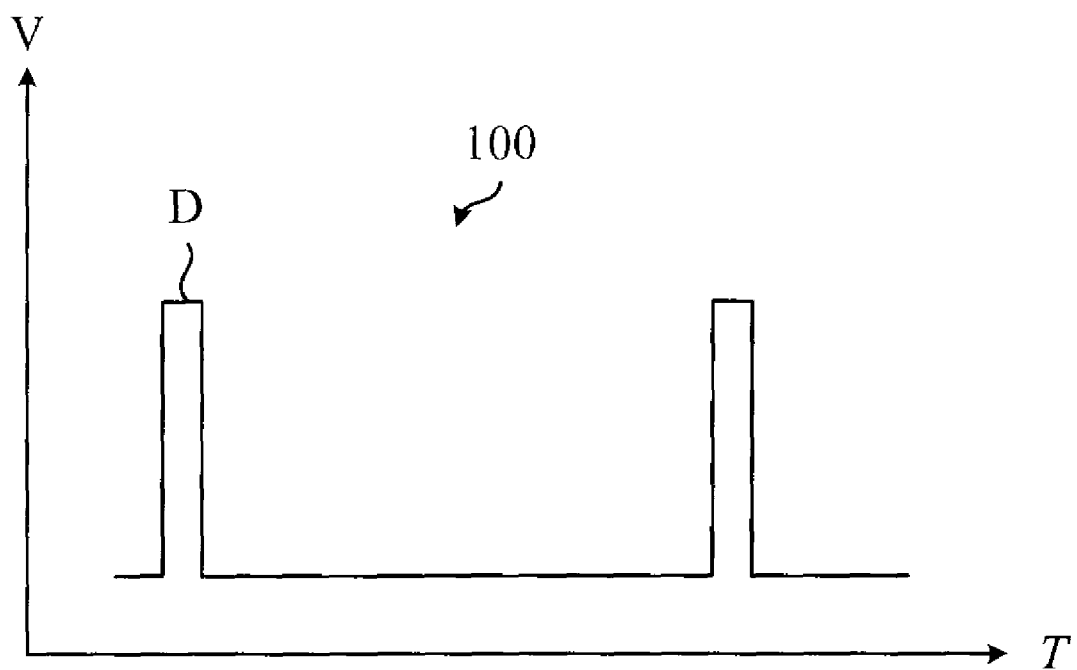
Figure 3:
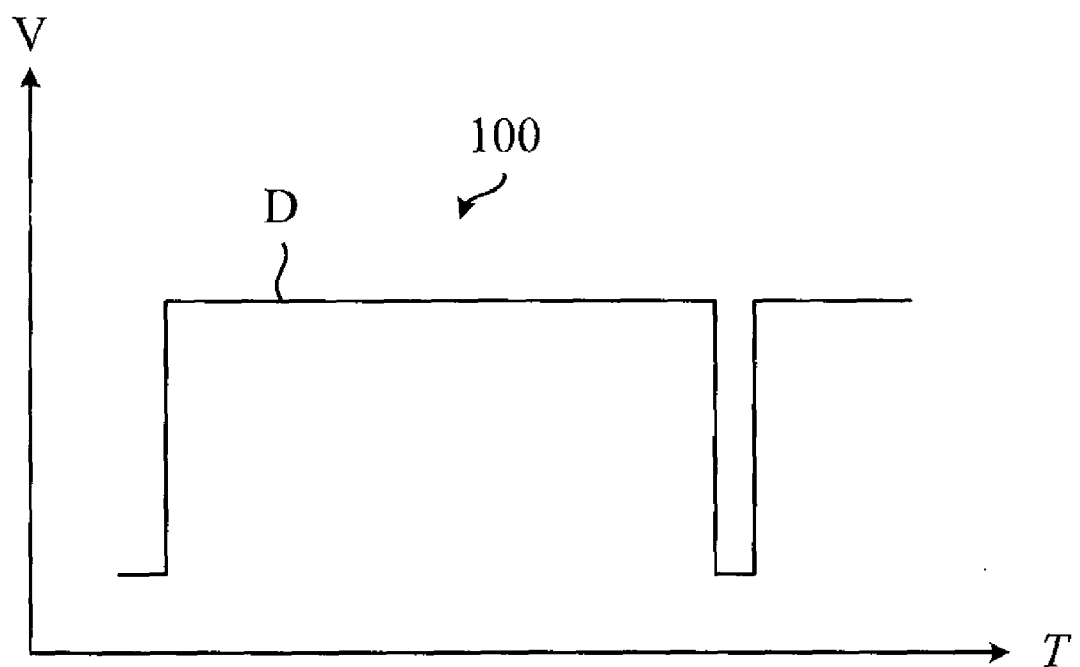

As shown in FIG. 3, another embodiment, the sensing unit 10 can also output a sensing signal 100 with a pulse width modulation according to the sensing rotating angle of the steering wheel or the column, wherein the horizontal axis is the time T and the vertical axis is the output voltage V of the sensing signal 100 at time T. Please note that in FIG. 3 which only illustrates the sensing signal 100 located at both sides of the datum point of the steering wheel and the steering column. In practice, according to the resolution of the sensing unit 10, the sensing signal 100 comprises a series of pulse signals of the duty cycle D with different width. As shown in FIG. 3, the width of the duty cycle D has obvious difference so as to generate the non-continuous status when the sensing signal 100 at the two sides of the steering wheel's datum point. Similarly, the processing unit 12, according based on the appearance times of the non-continuous status of the sensing signal 100, calculates the rotating loops of the steering wheel. In addition, the width of the duty cycle D of the sensing signal 100 represents the relative angle in a single loop of the steering wheel relating the datum point. Similarly, the processing unit 12, based on the relative angle in a single loop coordinate with the rotating loops of the steering wheel, calculates for the actual rotating angle of the steering wheel and the steering column.

Please refer to FIG. 1. The storage unit 14 is for storing the number of loops and the relative angle in a single loop obtained from the above processing unit 12, according to the sensing signal 100. However, in practice, if the storage unit 14 receives the number of loops and the relative angle in a single loop continuously, it is possible for the mass data to destroy the storage unit 14. Therefore, the storage unit 14 may store under the specific condition to avoid damaging. For example, before the power to the angle sensing device 1 is turned off, the storage unit 14 stores the number of loops and the value of the relative angle in a single loop before the power from the battery is turned off. When the car restarts and supplies power to the angle sensing device 1, the storage unit 14 provides the current rotating angle of the steering wheel to prevent the sensing unit from making erroneous judgment. If there is no storage unit 14 and the steering wheel is at the angle of 500° while the power from the battery is turned off, when the car restarts and supplies power to the angle sensing device 1, the sensing unit 10 may detect the rotating angle of the steering wheel to be 140°.

The power needed by the said angle sensing device 1 can be provided by the power source of the car or an external power source, to carry on the angle sensing of the steering wheel or the steering column. When the power source can not supply the power, the storage unit 14 takes action to store the number of loops and the value of the relative angle in a single loop. Hence, the storage unit 14 includes the power detection mechanism to detect if there is enough power for the storage.

Figure 4:
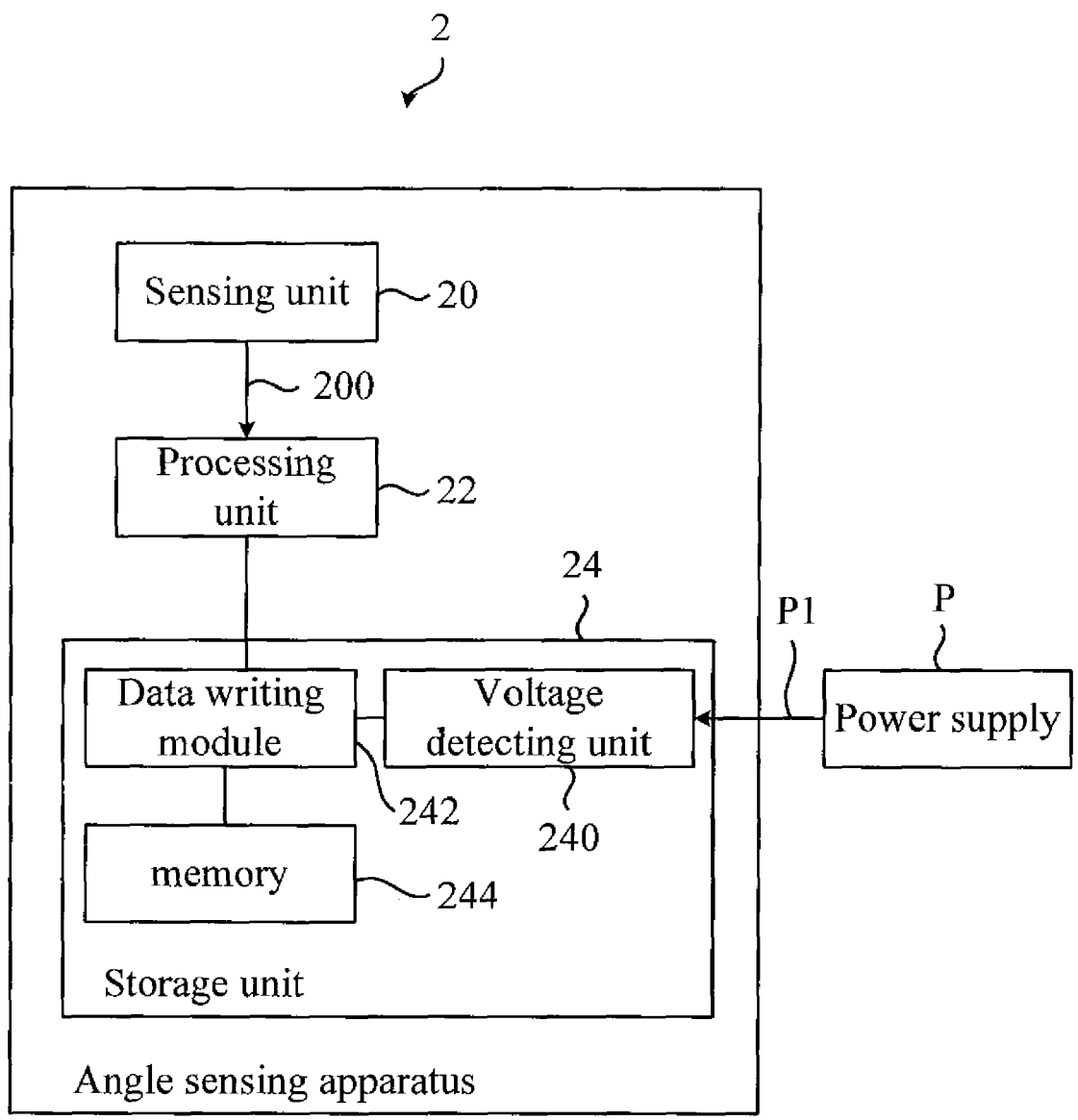
FIG. 4 is an angle sensing device according to another embodiment of the invention.

Please refer to FIG. 4, which illustrates an angle sensing device 2 according to another embodiment of the invention. As shown in FIG. 4, the storage unit 24 of the angle sensing device 2 comprises a voltage detection circuit 240, a data writing module 242, and a memory 244. Moreover, the other parts of the angle sensing device 2 are the same as the corresponding components of the last embodiment and will not be further described here. The voltage detection module 240 connects a power source P and receives a first electric power P1 from the power source P. Please note that in practice, the power source P can also supply the power to the sensing unit 20 and the processing unit 22 of the angle sensing device 2 simultaneously. The data writing module 242 couples to the voltage detection unit 240 and the processing unit 22. The memory 244 couples to the data writing module 242.

In the embodiment, the voltage detection module 20 can sense if the first electric power P1 is lower than a predetermined value. If the first electric power P1 is lower than the predetermined value, the data writing module 242 stores the number of loops and the relative angle in a single loop of the processing unit 22 determined by the sensing signal 200 into the memory. Please note that in practice, when the power source stops supplying power in accidents, there is still a short span for the circuit to maintain supplying the voltage for the normal work of the data writing module, the short span is known to be about 14 ms after testing. However, it only takes 4 ms for the data writing module to store the number of loops and the relative angle in a single loop into the memory.

The said angle sensing device detects the relative angle in a single loop of the steering wheel and the steering column after restarting operation, and compares with the number of loops in the storage unit, to get the actual rotating angle of the steering wheel and the steering column. However, if the steering wheel and the steering column rotate across the datum point when the angle sensing device stops operating to result in the situation in which the rotating loops are different with the number of loops stored in the storage unit, then it is possible for the angle sensing device to judge on the error rotating angle. Therefore, another embodiment of the invention provides a design of the steering column to cooperate with the above mentioned angle sensing device to prevent the situation in which the angle sensing device calculates the error rotating angle of the steering wheel after operation is restarted.

Figure 5:
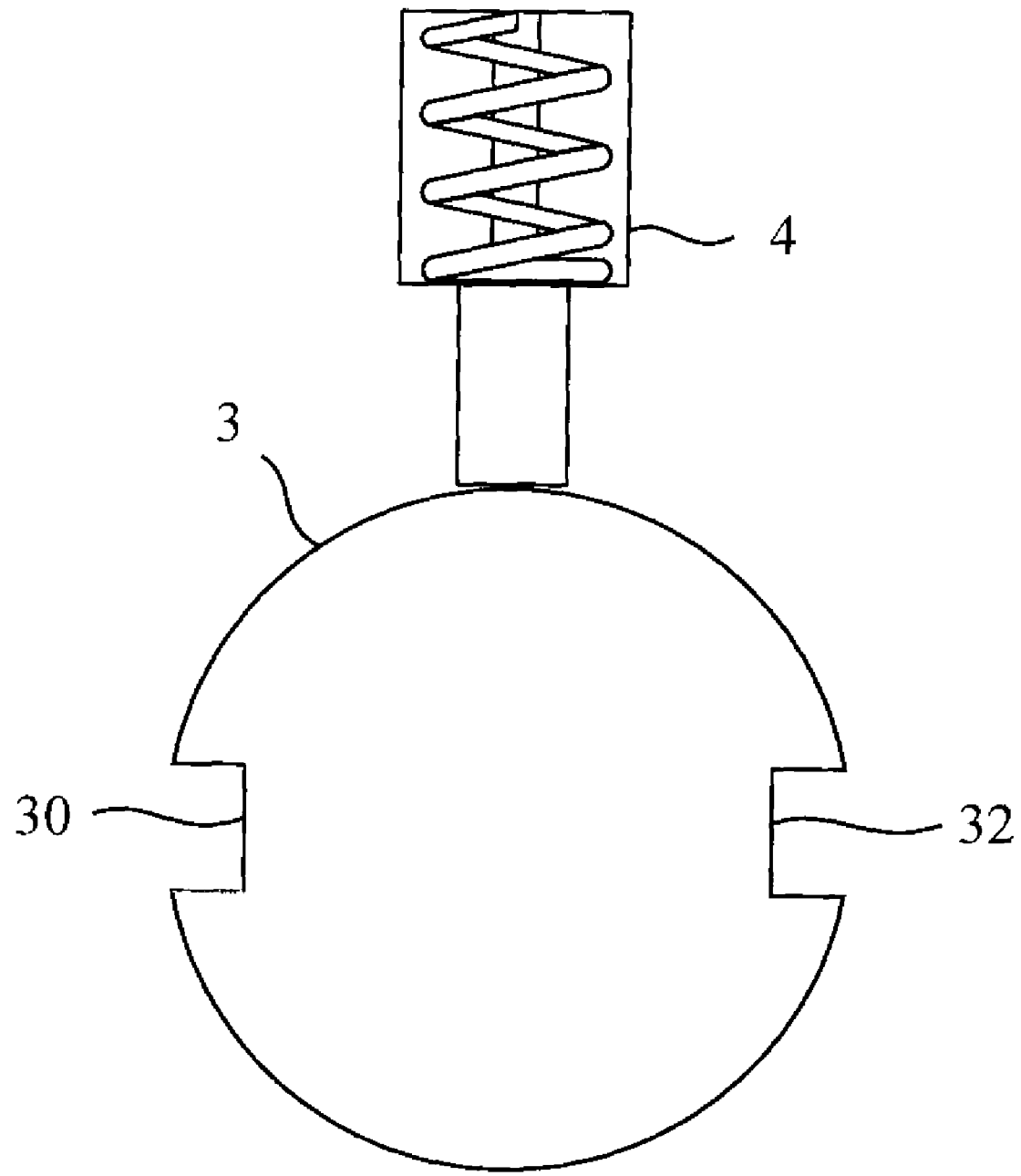
FIG. 5 is a cross-section of a steering column according to an embodiment of the invention.

Please refer to FIG. 5, which illustrates a cross-section of a steering column 3 according to an embodiment of the invention. As shown in FIG. 5, the steering column 3 rotates clockwise or counterclockwise together with the steering wheel (not illustrated in the figure) and the outside of the steering column 3 comprises a first keyway 30 and a second keyway 32 disposed approximately at 180° apart from keyway 30. When the said power source stops supplying the first electric power to the angle sensing device and the steering column 3, along with the steering wheel, rotates to the first keyway 30 or the second keyway 32 aiming at a bolt 4, the bolt 4 then can be embedded in the aimed first keyway 30 or the second keyway 32 to fix the steering column 3. Please note that in practice, whether the bolt 4 is embedded into the first keyway 30 or the second keyway 32 depends on the demand of the user or the designer. For example, if the steering angle sensing device is destroyed in the driving, the bolt 4 may not have to be embedded into the first keyway 30 or the second keyway 32 to prevent the accident.

In the embodiment, the rotatable angle of the steering column 3 is divided into several angle blocks. These angle blocks are separated from the positions of the datum point, the first keyway 30 and the second keyway 32 when the steering column 3 does not rotate any angle. Similarly, in practice, the division of these angle blocks may also be done by other ways, which depends on the demand of the user or the designer, and is not limited to the embodiment of the invention. When the angle sensing device of the said embodiment stops operating because the power source stops supplying the first power for any reason, the storage unit immediately stores the number of loops and the relative angle in a single loop of the steering wheel and the steering column 3. If the steering wheel and the steering column rotate in the period of the angle sensing device stops operation, the maximum rotating angle is limited by the first keyway 30 and the second keyway 32. In other words, the steering wheel and the steering column 3 will not rotate unlimitedly to result in erroneous judgment of the loops of the steering wheel and the steering column when the angle sensing device is restarted in operation.

According to the relative angle in a single loop stored in the storage unit and the deflection angle of the steering wheel and the steering column when the angle sensing device restarts operation (i.e. the sensing relative angle in a single loop when the angle sensing device is restarted in operation), the said angle sensing device can calculate the correct number of loops. By the correct number of loops and the relative angle in a single loop of the steering wheel and the steering column 3 obtained when the angle sensing device is restarted in operation, the angle sensing device can calculate to obtain the actual rotating angle of the steering wheel and the steering column 3.

About determining the rotating loops of the steering wheel and the steering column 3 after the angle sensing device is restarted in operation, it can be obtained in practice from calculating directly by the processing unit of the angle sensing device, or in the processing unit, according to the said angle blocks, establish a logic judgment table to determine the number of loops.

For example, when the angle sensing device stops operation, the relative angle in a single loop of the steering wheel and the steering column 3 stored in the storage unit is $\theta_1$, and when the angle sensing device is restarted in operation, the sensing relative angle in a single loop is $\theta_2$. The processing unit of the angle sensing device, according to the angle block of $\theta_1$ and the angle block of $\theta_2$, calculates directly or checks the table to modify the number of loops stored in the storage unit. Besides, because the said modification is suitable for smaller deflection angle, the first keyway 30 and the second keyway 32 disposed approximately at 180° can be used for limiting the deflection angle to match the said modification. Please note that in practice, the number of the keyway depends on the demand of the user or the designer, but is not limited to the mentioned examples of the embodiment in the description.

The said steering column and the angle sensing device can be set as an angle sensing system in another embodiment. The angle sensing system can sense the actual rotating angle of the steering wheel and the steering column connecting the same according to the units of the said angle sensing device. In addition, when the angle sensing device stops operation and the steering wheel and the steering column are still rotated, after the operation is restarted, the angle sensing device cooperates with the keyway design on the steering column, and calculates correctly the actual rotating angle of the steering wheel and the steering column.

Compared to prior art, the angle sensing device and the angle sensing system of the invention detect the relative angle in a single loop and the number of loops of the steering wheel and the steering column, to calculate and obtain the actual rotating angle of the steering wheel and the steering column. Based on this, the range of sensing angles of the angle sensing device and the angle sensing system are not restricted. Besides, cooperating with the keyway design on the steering column, the angle sensing device and the angle sensing system of the invention obtain correctly the actual rotating angle of the steering wheel and the steering column. Furthermore, the angle sensing device of the invention only needs a sensor, unlike the prior art which needs two or more sensors and a plurality of gears; therefore it can reduce the production cost.

Although the present invention has been illustrated and described with reference to the preferred embodiment thereof, it should be understood that it is in no way limited to the details of such embodiment but is capable of numerous modifications within the scope of the appended claims.

What is claimed is:

1. An angle sensing device for sensing a rotating angle of a steering wheel from a datum point, the angle sensing device externally connecting with a power supply and receiving a first electric power from the power supply for sensing, the angle sensing device comprising:
    a sensing unit for sensing the rotating angle of the steering wheel and outputting a sensing signal, based on the rotating angle;
    a processing unit for determining, based on the sensing signal, a number of loops of the steering wheel rotating from the datum point and a relative angle in a single loop corresponding to the datum point; and for calculating, based on the number of loops and the relative angle in the single loop, the rotating angle; and
    a storage unit for receiving and storing the number of loops and the relative angle in the single loop;
    wherein when the steering wheel rotates across the datum point, the sensing signal outputted by the sensing unit presenting a non-continuous status, and the processing unit determining, based on the presenting times of the non-continuous status, the number of loops.

2. The angle sensing device of claim 1, wherein the sensing signal is an analog output signal.

3. The angle sensing device of claim 2, wherein when the steering wheel rotates across the datum point, the voltage of the analog output signal is not continuous, and results in the non-continuous status of the sensing signal.

4. The angle sensing device of claim 1, wherein the sensing signal is a pulse width modulation output signal.

5. The angle sensing device of claim 4, wherein when the steering wheel rotates across the datum point, a work cycle rate of the pulse width modulation output signal changes substantially, and results in the non-continuous status of the sensing signal.

6. The angle sensing device of claim 1, wherein the sensing unit comprises one selected from a group consisting of a non-contact Hall effect angle sensor, a circular optical encoder and a resolver.

7. The angle sensing device of claim 1, wherein the storage unit further comprises:
    a voltage detecting circuit for sensing if the first electric power is lower than a predetermined value;
    a data writing module coupling to the voltage detecting circuit and the processing unit; and
    a memory coupling to the data writing module, for storing the number of loops and the relative angle in the single loop;
    wherein when the voltage detecting circuit detects that the first electric power is lower than the predetermined value, the data writing module stores the number of loops and the relative angle in the single loop of the processing unit into the memory.

8. The angle sensing device of claim 1, wherein the central axis of the steering wheel connects to a steering column, the steering column together with the steering wheel rotate the rotating angle from the datum point, and the sensing unit senses the rotating angle of the steering column.

9. The angle sensing device of claim 8, wherein the steering column further comprises a first keyway and a second keyway disposed approximately opposite to the first keyway; when the steering column along with the steering wheel rotate to the first keyway or the second keyway and aim at a bolt in the period of the power supply stop supplying the first electric power, the bolt is embedded into the aimed first keyway or second keyway to fix the steering column.

10. The angle sensing device of claim 9, wherein when the steering column, along with the steering wheel, rotates to a deflection angle in the period of the power supply stop supplying the first electric power and when the power supply is restarted to supply the first electric power, the sensing unit senses the deflection angle and outputs a deflection sensing signal; the processing unit compares the deflection sensing signal with the relative angle in the single loop stored in the storage unit to determine the number of loops and the relative angle in the single loop of the steering wheel, when the power supply restarts to supply the first electric power, to calculate the rotating angle.

11. The angle sensing device of claim 10, wherein the processing unit comprises a logic judgment table, the processing unit compares, according to the logic judgment table, the deflection sensing signal with the relative angle in the single loop stored in the storage unit to determine the number of loops and the relative angle in the single loop of the steering wheel, when the power supply is restarted to supply the first electric power and calculates the rotating angle.

12. An angle sensing system for sensing a rotating angle of a steering wheel from a datum point, the angle sensing system is externally connected with a power supply and receiving a first electric power from the power supply for sensing, the angle sensing system comprising:
    a steering column for connecting with the central axis of the steering wheel, the steering column together with the steering wheel rotating the rotating angle from the datum point; the steering column further comprising a first keyway and a second keyway disposed roughly opposite to the first keyway;
    a sensing unit for sensing the rotating angle of the steering column and outputting a sensing signal, based on the rotating angle, a sensing signal;
    a processing unit for determining, based on the sensing signal, a number of loops of the steering column rotating from the datum point and a relative angle in a single loop corresponding to the datum point; and for calculating, based on the number of loops and the relative angle in the single loop, the rotating angle;
    a storage unit for receiving and storing the number of loops and the relative angle in the single loop; and
    a bolt for inserting selectively into one of the first keyway and the second keyway to fix the steering column;
    wherein when the steering column rotates across the datum point, the sensing signal outputted by the sensing unit presenting a non-continuous status, and the processing unit determining, according to the presenting times of the non-continuous status, the number of loops.

13. The angle sensing system of claim 12, wherein the sensing signal is an analog output signal, when the steering wheel rotates across the datum point, the voltage of the analog output signal is not continuous, and results in the non-continuous status of the sensing signal.

14. The angle sensing system of claim 12, wherein the sensing signal is a pulse width modulation output signal.

15. The angle sensing system of claim 14, wherein when the steering column rotates across the datum point, a work cycle rate of the pulse width modulation output signal changes substantially, and results in the non-continuous status of the sensing signal.

16. The angle sensing system of claim 12, wherein the sensing unit comprises one selected from a group consisting of a non-contact Hall effect angle sensor, a circular optical encoder and a resolver.

17. The angle sensing system of claim 12, wherein the storage unit further comprises:
- a voltage detecting circuit for sensing if the first electric power is lower than a predetermined value;
- a data writing module coupling to the voltage detecting circuit and the processing unit; and
- a memory coupling to the data writing module, for storing the number of loops and the relative angle in the single loop;
- wherein when the voltage detecting circuit detects that the first electric power is lower than the predetermined value, the data writing module stores the number of loops and the relative angle in the single loop of the processing unit into the memory.

18. The angle sensing system of claim 12, wherein the bolt works when the power supply stops supplying the first electric power; when the steering column, along with the steering wheel, rotates to the first keyway or the second keyway and aims at the bolt in the period when the power supply stops supplying the first electric power, the bolt can be embedded into the aimed first keyway or the second keyway to fix the steering column.

19. The angle sensing system of claim 18, wherein when the steering column, along with the steering wheel, rotates to a deflection angle in the period when the power supply stop supplying the first electric power and when the power supply is restarted to supply the first electric power, the sensing unit senses the deflection angle and outputs a deflection sensing signal; the processing unit compares the deflection sensing signal with the relative angle in the single loop stored in the storage unit to determine the number of loops and the relative angle in the single loop of the steering wheel, when the power supply is restarted to supply the first electric power and calculates the rotating angle.

20. The angle sensing system of claim 19, wherein the processing unit comprises a logic judgment table, the processing unit compares, according to the logic judgment table, the deflection sensing signal with the relative angle in the single loop stored in the storage unit to determine the number of loops and the relative angle in the single loop of the steering wheel, when the power supply is restarted to supply the first electric power and calculates the rotating angle.

* * * * *